US011838059B2

(12) United States Patent
Sartorius et al.

(10) Patent No.: US 11,838,059 B2
(45) Date of Patent: Dec. 5, 2023

(54) OPTICAL ASSEMBLY AND METHOD FOR OPTICAL SIGNAL PROCESSING

(71) Applicant: Fraunhofer-Gesellschaft zur Förderung der angewandten Forschung e.V., Munich (DE)

(72) Inventors: Bernd Sartorius, Berlin (DE); Patrick Runge, Berlin (DE); Martin Schell, Berlin (DE)

(73) Assignee: Fraunhofer-Gesellschaft zur Förderung der angewandten Forschung e. V., Munich (DE)

(*) Notice: Subject to any disclaimer, the term of this patent is extended or adjusted under 35 U.S.C. 154(b) by 143 days.

(21) Appl. No.: 17/608,284

(22) PCT Filed: Apr. 30, 2020

(86) PCT No.: PCT/EP2020/062071
§ 371 (c)(1),
(2) Date: Nov. 2, 2021

(87) PCT Pub. No.: WO2020/225104
PCT Pub. Date: Nov. 12, 2020

(65) Prior Publication Data
US 2022/0231767 A1 Jul. 21, 2022

(30) Foreign Application Priority Data
May 3, 2019 (DE) ...................... 10 2019 206 415.9

(51) Int. Cl.
*H04B 10/572* (2013.01)
*G01B 9/02* (2022.01)
(Continued)

(52) U.S. Cl.
CPC ............. *H04B 10/572* (2013.01); *G01B 9/02* (2013.01); *G02B 6/2861* (2013.01); *G02B 6/29302* (2013.01)

(58) Field of Classification Search
CPC .... G01B 9/02; G02B 6/2861; G02B 6/29302; G02B 6/29346; H04B 10/63; H04B 10/61;
(Continued)

(56) References Cited

U.S. PATENT DOCUMENTS 5,367,305 A * 11/1994 Volker ................. H01Q 3/2676
342/368
2013/0022361 A1 * 1/2013 Schell ................... H04J 14/021
398/208
(Continued)

FOREIGN PATENT DOCUMENTS

DE 102014213442 A1 1/2015
WO 2011083165 A1 7/2011

OTHER PUBLICATIONS

Winzer, "An Opto-Electronic Interferometer and Its Use in Subcarrier Add/Drop Multiplexing", Journal of Lightwave Technology, vol. 31, No. 11 (Jun. 1, 2013), pp. 1775-1782.

*Primary Examiner* — Hibret A Woldekidan
(74) *Attorney, Agent, or Firm* — The Webb Law Firm

(57) ABSTRACT

An optical assembly for optical signal processing including a first input for coupling in a first light signal; a second input for coupling in a second light signal; a first beam splitter for splitting the first light signal into a first part and a second part; a second beam splitter for splitting the second light signal into a first part and a second part; a superposing unit; a detector; an electronic signal processing unit; at least one actuating unit; and a delay line for generating a delay of the running time of the first part of the first light signal and of the first part of the second light signal up to the superposing
(Continued)

unit. The delay line is configured such that the first part of the first light signal and the first part of the second light signal pass through the delay line in opposite directions.

15 Claims, 7 Drawing Sheets

(51) Int. Cl.
*G02B 6/28* (2006.01)
*G02B 6/293* (2006.01)

(58) Field of Classification Search
CPC ........ H04B 10/50; H04B 10/40; H04B 10/64; H04B 10/66; H04B 17/00; H04B 10/572; H04B 10/60; H04B 10/613; H04B 10/6151; H04B 10/615; H04B 10/616; H04J 14/06; H04J 14/02; H04J 14/0205
USPC ........ 398/201, 202, 205, 206, 208, 212, 213
See application file for complete search history.

(56) References Cited

U.S. PATENT DOCUMENTS

| | | | |
|---|---|---|---|
| 2013/0070254 A1* | 3/2013 | Winzer | H04J 14/0201 356/477 |
| 2015/0063810 A1* | 3/2015 | Hayami | H04J 14/0221 398/65 |
| 2015/0253199 A1* | 9/2015 | Sartorius | H01S 3/0014 250/341.7 |
| 2022/0291381 A1* | 9/2022 | Kurz | G01S 17/36 |

\* cited by examiner

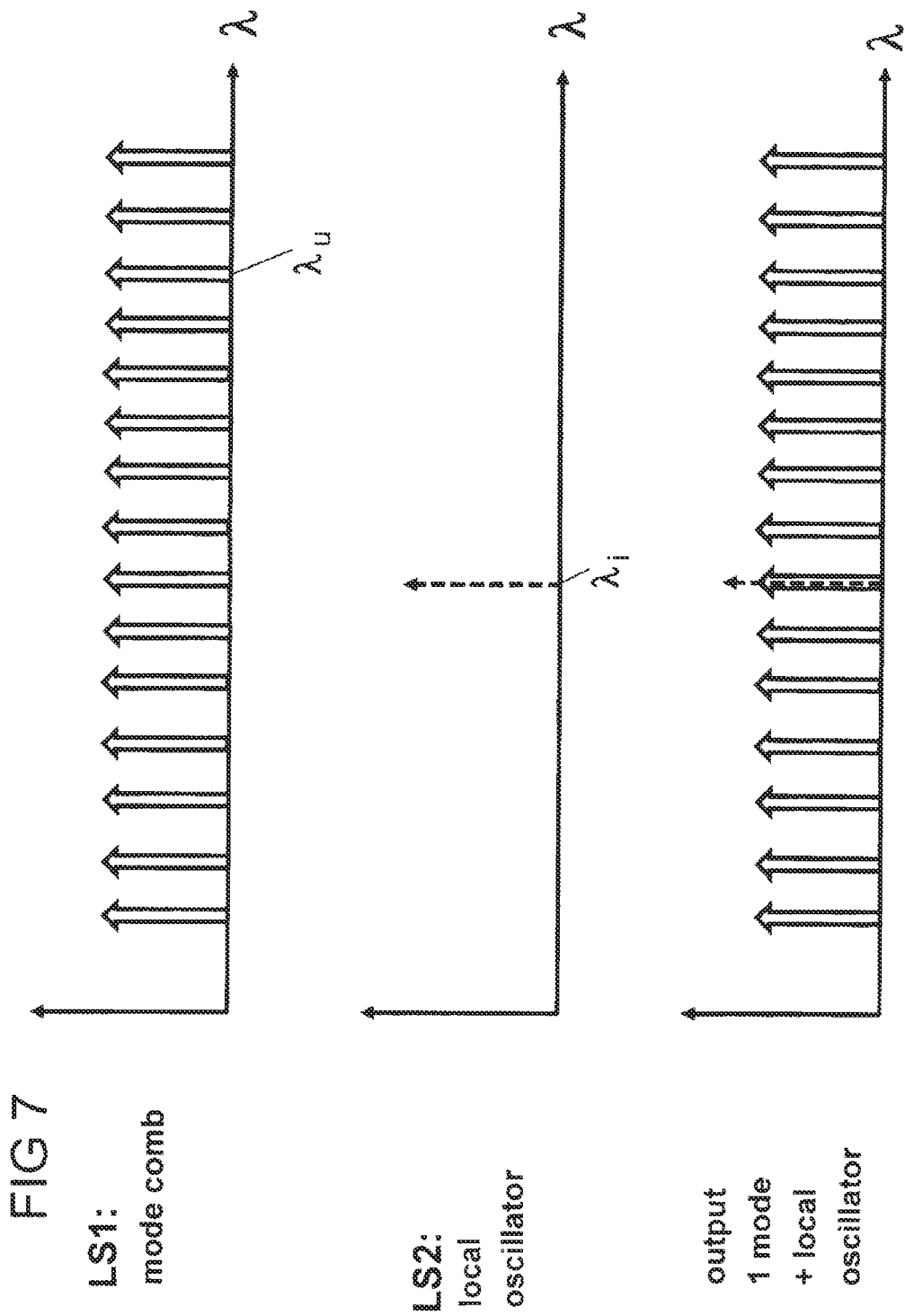

OPTICAL ASSEMBLY AND METHOD FOR OPTICAL SIGNAL PROCESSING

CROSS-REFERENCE TO RELATED APPLICATIONS

This application is the United States national phase of International Application No. PCT/EP2020/062071 filed Apr. 30, 2020, and claims priority to German Patent Application No. 10 2019 206 415.9 filed May 3, 2019, the disclosures of which are hereby incorporated by reference in their entirety.

BACKGROUND OF THE INVENTION

Field of the Invention

This disclosure relates to an optical assembly for optical signal processing and to a method for optical signal processing.

Description of Related Art

It is known from the prior art to process optical signals by specifically bringing them to interference. For example, a particular wavelength of a wavelength multiplex mode comb of an optical signal can be selectively processed by interference of the signal with a suitable other optical signal. Such an interferometric superposition of two optical signals (two light waves) however requires that the two optical signals have the same polarization and also the same amplitude as far as possible. Furthermore, a rather constant phase relationship of the two signals is necessary.

These requirements are problematic in particular when light waves that do not originate from the same source and/or that have lost their coherence for example due to long itineraries are to be brought to interference. One possibility of efficiently bringing light waves to interference also in this situation consists in first detecting the correlation of the two waves in terms of phase, amplitude and polarization in order to then set the phase, amplitude and polarization of at least one of the light waves such that subsequently an efficient interferometric signal processing is possible ("feed-forward regulation"). This regulation is effected by means of an electronic circuit, wherein the electronic signal processing however is slower than the propagation of the light waves. The electronic signal processing in particular is expensive and involves a large amount of computing time, when a data signal is modulated onto one of the light waves (signal waves), the amplitude and/or phase of the light wave hence change very quickly, e.g. in the Gb/s range of the telecommunication.

In this connection, it is known from EP 2 524 458 B1 to prolong the running time of one of the light waves by means of a delay line. However, this requires delay lines with lengths in the range of a few meters, whereby instabilities of the phase of the light wave passing through the delay line and thus a non-stable phase relationship of the light waves to be superposed with each other can occur.

SUMMARY OF THE INVENTION

The problem underlying the proposed solution consists in keeping the effect of the delay on the phase relationship between the light waves as low as possible.

This problem is solved by an optical assembly with feature as described herein and by a method with features as described herein.

Accordingly, there is provided an optical assembly for optical signal processing, comprising
  a first input for coupling in a first light signal;
  a second input for coupling in a second light signal;
  a first beam splitter for splitting the first light signal into a first part and a second part;
  a second beam splitter for splitting the second light signal into a first part and a second part;
  a superposing unit (in particular in the form of an interferometer unit) for superposing the first part of the first light signal with the first part of the second light signal;
  a detector for detecting the second part of the first light signal and the second part of the second light signal, wherein the detector is configured to generate at least one electrical signal dependent on the detected second parts of the first and second light signals;
  an electronic signal processing unit that is configured to generate at least one control signal in dependence on the signal generated by the detector;
  at least one (in particular electrooptical) actuating unit to which the control signal generated by the electronic signal processing unit can be fed and which is configured to change the phase and/or the amplitude and/or the polarization of the first part of the first light signal and/or the second part of the second light signal in dependence on the control signal, before the first parts of the first and second light signals are superposed in the superposing unit;
  a delay line for generating a delay of the running time of the first part of the first light signal and of the first part of the second light signal up to the superposing unit, wherein
  the delay line is configured and arranged in such a way that the first part of the first light signal and the first part of the second light signal pass through the delay line in opposite directions.

The light signals to be brought to interference with each other thus run through the same delay line, so that the length of the delay line automatically is identical for the two signals. Furthermore, external influences on the delay line (for example changes in temperature and/or mechanical loads of the delay line) have an identical effect on the first and the second light signal. Phase changes resulting from this external influence thus cancel each other out when a difference is formed with respect to characteristic quantities of the two light signals, which allows stable interferometric signal processing even with a delay line of great length, for example also when using a mechanically flexible optical fiber (see below).

Thus, in particular an interferometer assembly with a feed-forward regulation can be implemented, which despite a great length (for example in the range of a few meters) of the delay line ensures the greatest possible phase stability. In addition, it is possible to set the delay of the running time by corresponding adaptation of the length of the delay line and in particular adapt the same to the duration of the electronic signal processing.

The delay line in particular is configured in such a way that the first part of the first and/or second light signal reaches the optical actuating unit at least substantially at the same time as the control signal. Thus, the control unit can be used to process exactly that part of the light signal (of the corresponding wave train) from which the control signal has been derived, and it can be ensured that those parts of the light signals on which the electrical signal generated by the detector is based arrive at the superposing unit at the same time. This simultaneity (coincidence) is important in particular when a high-rate data signal e.g. in the Gb/s range of the telecommunication is modulated onto one of the signal waves, i.e. when amplitude and/or phase of the light wave change very quickly.

The electrical signal generated by the detector in particular depends on the correlation of the first and second light signals in terms of their phase, amplitude and/or polarization.

An adaptation of the length of the delay line in particular is easily possible when the delay line is implemented by an optical fiber. In addition, an adjustment (in particular a fine adjustment) of the delay time can be achieved by using a delay line variable in length. A fine adjustment can also be effected by adaptation of the electronic processing (for example by inserting additional calculation steps).

For example, the detector comprises an interferometer in which the second parts of the first and second light signals can be superposed, and an active detection unit, in particular symmetrical photodetectors ("balanced detectors"), for detecting the two output signals of the interferometer.

The actuating unit can comprise a phase modulator, an amplitude modulator, a light amplifier, a polarization rotator and/or an interferometer assembly, in particular with integrated phase modulators for IQ modulation. It is also conceivable that the actuating unit and the superposing unit are arranged on a common carrier. In particular, the actuating unit and the superposing unit are formed by a single monolithically integrated chip.

The delay line in particular is formed by at least one optical waveguide. The optical waveguide can be an integrated optical waveguide, i.e. a waveguide that is formed of light-guiding layers arranged on a substrate. It is also conceivable, however, that the optical waveguide is implemented by an optical fiber (for example a single-mode fiber). For example, the delay line connects an output of the first beam splitter to an output of the second beam splitter. The length of the delay line (in particular of said optical fiber) for example is 0.1 m to 20 m, in particular 1 m to 10 m (corresponding to a delay of 0.5 ns to 100 ns or 5 ns to 50 ns).

The optical paths between the first beam splitter and the detector and between the second beam splitter and the detector, respectively, in particular at least substantially have identical lengths and in particular are each implemented by an integrated optical waveguide and as phase-stable as possible; for example on a hybrid or monolithically integrated planar waveguide platform.

According to another embodiment, the optical assembly comprises a third beam splitter (a first backward beam splitter) with which a part of the first part of the first light signal can be split off and be fed to the superposing unit. Analogously, there can also be provided a fourth beam splitter (a second backward beam splitter) with which a part of the first part of the second light signal can be split off and be fed to the superposing unit.

The third and the fourth beam splitter in particular are each located behind the delay line, i.e. between the delay line and the superposing unit and/or between the delay line and the first or the second beam splitter, respectively. Thus, after passing through the delay line by means of the backward beam splitters, the signals are separated from the input signals each running in opposite directions and are guided to the superposing unit. In one of the paths between the two backward beam splitters and the superposing unit the actuating unit is disposed. It is also conceivable that in both branches of the optical assembly an actuating unit is present so that an adaptation both of the first and of the second light signal can be effected. In addition, in particular the lengths of the paths each between the backward beam splitters and the superposing unit are at least approximately identical (or at least have a fixed specified difference to each other). For example, the backward beam splitters and the superposing unit are optically connected to each other via correspondingly configured waveguides. The waveguides for example are part of a planar waveguide platform; in particular part of the same waveguide platform as the above-mentioned connection between the first and second beam splitters and the detector. Due to the possible small length of the waveguides, the same can be implemented in particular as phase-stable as possible.

For example, the third beam splitter is formed by a circulator and/or the fourth beam splitter is formed by a circulator. It is also possible that the third beam splitter is formed by a polarization splitter and/or the fourth beam splitter is formed by a polarization splitter. It is conceivable that the light waves passing through the polarization splitter in forward and backward directions are polarized perpendicular to each other. This can be achieved for example in that the light waves passing through the delay line undergo a rotation of their polarization by 90°. This can be implemented particularly easily when a polarization-maintaining (PM) optical fiber is used, which is arranged on the second outputs of the first or second beam splitter/waveguide with an orthogonal alignment of the optical axes.

In addition, it is also possible that the first and the fourth beam splitter together are formed by a (single) first coupler and/or the second and the third beam splitter together are formed by a (single) second coupler.

According to another exemplary embodiment, the first and the second beam splitter are arranged on a common carrier. It is also possible that the first beam splitter is connected to the fourth beam splitter via a first connection waveguide, and the second beam splitter is connected to the third beam splitter via a second connection waveguide, wherein in particular the first, second, third and fourth beam splitters as well as the first and the second connection waveguide are fixed on a common carrier. The common carrier in particular is part of the waveguide platform already mentioned above. It is also conceivable that further waveguides are present, which likewise are integrated-optically arranged on the carrier (i.e. likewise form part of the waveguide platform).

The detector can be formed by an integrated optoelectronic chip which in particular is connected to the carrier in such a way that a first output waveguide arranged on the carrier is coupled and in particular aligned with a first input waveguide of the optoelectronic chip, and a second output waveguide arranged on the carrier is coupled and in particular aligned with a second input waveguide of the optoelectronic chip. For example, the chip is fastened to an end face of the carrier (in particular in a phase-stable way).

As already mentioned above, it is also possible that the superposing unit and the actuating unit are configured as a monolithically integrated chip. This chip in particular is connected to the above-mentioned carrier (the waveguide platform) so that waveguides of the chip are aligned with waveguides of the waveguide platform.

It is also possible, however, that an active detection unit of the detector is disposed on a separate substrate, while the at least one passive component (for example a coupler and/or a waveguide) of the detector is disposed on the above-mentioned carrier together with the first and the second beam splitter (and possibly for example also with the third and fourth beam splitters and the above-mentioned connection waveguides). The detection unit for example is connected to the carrier; namely in particular in such a way that it receives light that exits from at least one waveguide which is located on the carrier. In particular, the detection unit is arranged at an output of the above-mentioned waveguide platform.

It is also possible, however, that the superposing unit together with the first and the second beam splitter (and possibly for example also with the third and fourth beam splitters and the above-mentioned connection waveguides) is disposed on the above-mentioned carrier, wherein the electrooptical actuating unit however is implemented on another carrier (which e.g. has another carrier material). The electrooptical actuating unit here can be arranged on a facet or surface of the waveguide platform so that light that exits from at least one waveguide of the waveguide platform is coupled into the input waveguide of the actuating unit, and light from the output waveguide of the actuating unit is coupled into a waveguide of the waveguide platform.

The solution also relates to a method for optical signal processing by using an optical assembly according to the solution, comprising:

coupling a first light signal into a first input of the optical assembly;

coupling a second light signal into a second input of the optical assembly;

splitting the first light signal into a first part and a second part;

splitting the second light signal into a first part and a second part;

detecting the second part of the first light signal and the second part of the second light signal by means of a detector and generating at least one electrical signal in dependence on the received second parts of the first and second light signals;

generating at least one control signal in dependence on the signal generated by the detector by means of an electronic signal processing unit;

generating a delay of the running time of the first part of the first light signal and of the first part of the second light signal up to the superposing unit of the optical assembly, changing the phase, the amplitude and/or the polarization of the first part of the first light signal and/or the first part of the second light signal in dependence on the control signal; and superposing the first part of the first light signal with the first part of the second light signal after changing the phase, the amplitude and/or the polarization of the first part of the first light signal and/or the first part of the second light signal, wherein the delay of the running time is generated by the first part of the first light signal and the first part of the second light signal passing through a delay line in opposite directions.

It is possible that the first light signal has a spectrum which includes a plurality of wavelengths spaced apart from each other, wherein the spectrum of the second light signal substantially comprises a wavelength that corresponds to one of the wavelengths of the first light signal. For example, the spectrum of the first light signal is configured in the manner of a wavelength comb. By superposing the first and the second light signal with each other, a targeted processing of that wavelength of the first light signal that corresponds to the wavelength of the second light signal can be effected. In particular, such processing of the wavelength can be effected without other wavelengths of the first light signal being influenced significantly. For example, this wavelength can be deleted from the first light signal. What is also conceivable, however, is adding up the signals or modulating the first light signal.

In particular, it is also possible that the first light signal is a signal onto which a data signal is modulated, whereas the second light signal is provided by a local oscillator.

The exemplary embodiments, which are explained above in connection with the optical assembly according to the solution, analogously can of course also be used for developing the method according to the solution.

BRIEF DESCRIPTION OF THE DRAWINGS

The proposed solution will be explained in detail below by means of exemplary embodiments with reference to the Figures.

FIG. 7 shows spectra of input signals and of an output signal in use of the optical assembly according to the solution for processing a mode comb.

DESCRIPTION OF THE INVENTION

Figure 1:
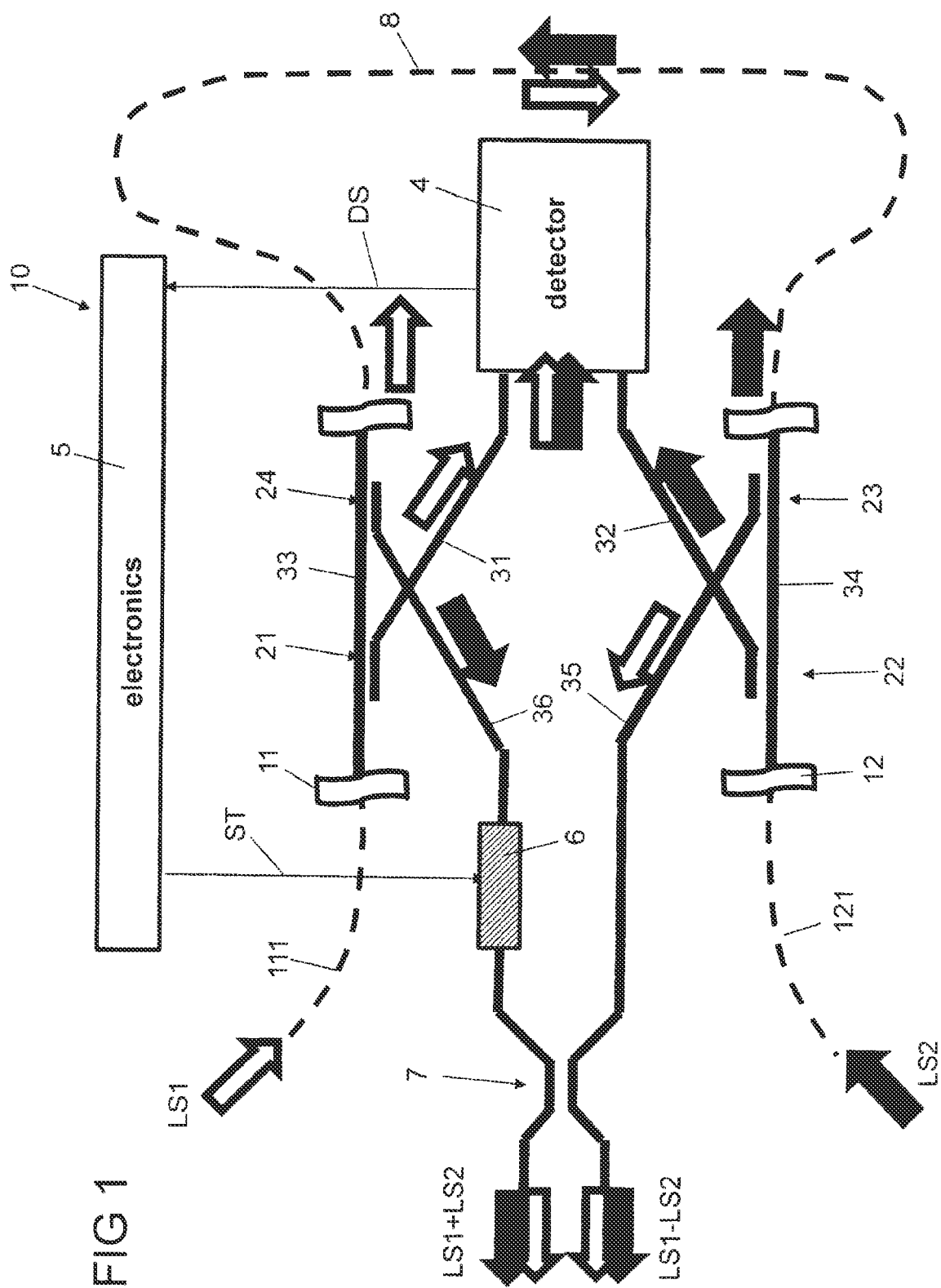
FIG. 1 schematically shows an optical assembly according to a first exemplary embodiment.

FIG. 1 shows a schematic view of an optical assembly according to the solution in the form of an optical circuit 10. The optical circuit 10 comprises a first and a second input (interface) 11, 12 for coupling in a first and a second light signal LS1, LS2, respectively. The light signals LS1, LS2 are coupled into the inputs 11, 12 for example via optical fibers 111, 121.

The light signals LS1, LS2 are to be brought to interference in a superposing unit 7; for example, in order to process at least one of the light signals LS1, LS2 (in particular in a wavelength-selective manner), as already explained above. The light signals LS1, LS2 in particular originate from different sources and/or have been guided to the optical circuit 10 over longer distances so that it must be assumed that there is no stable, known phase relationship with respect to the light signals LS1, LS2. The polarization and/or the amplitudes of the light signals LS1, LS2 also can be unknown and in particular can be different. For this reason, one part of the light signals LS1, LS2 each is detected by means of a detector 4 in order to obtain information on properties, in particular the phase, polarization and/or the amplitude of the light signals LS1, LS2. By means of an electronic signal processing unit 5, a control signal ST is generated with reference to detector signals DS which the detector 4 generates on detection of the light signals LS1, LS2 and which are forwarded to the electronic signal processing unit 5, by which control signal an electrooptical actuating unit 6 is actuated, and by which in dependence on the control signal the phase, the amplitude and/or the polarization of at least one of the light signals LS1, LS2 can be adapted. The adapted signal (or the two adapted signals) then are superposed in the superposing unit 7. By means of a delay line 8 it is ensured that the first and/or the second light signal LS1, LS2 arrive at the actuating unit 6 at least substantially at the same time as the electrical control signal ST.

In detail, the optical circuit 10 comprises a first and a second beam splitter in the form of a first and a second forward splitter 21, 22, wherein the forward splitters 21, 22 each split the light signal LS1, LS2 coupled into the optical circuit 10 into a first part and a second part. The second part of each of the light signals LS1, LS2 is fed to the detector 4 via connection waveguides 31, 32, while the first part of each of the light signals LS1, LS2 runs to the superposing unit 7 configured in the form of an interferometer via third and fourth beam splitters in the form of first and second backward splitters 23, 24 and the delay line 8. The forward splitters 21, 22 in particular couple out only a minor proportion of the optical power for the detection in the detector 4. For example, the proportion of the optical power of the second parts of the light signals LS1, LS2 coupled out is not more than 10% or not more than 5% of the light power coupled in.

The backward splitters 23, 24 each are connected to the forward splitters 21, 22 via connection waveguides 34, 33. Correspondingly, the first parts of the light signals LS1, LS2 each split off in the forward splitters 21, 22 each run over the connection waveguides 34, 33 from an output of the forward splitters 21, 22 up to an input of one of the backward splitters 23, 23 and finally through the same. One end of the delay line 8 each communicates with one of the backward splitters 23, 24 (e.g by direct coupling or via a waveguide). The first part of the first light signal LS2 thus passes through the second backward splitter 24 and the delay line 8, wherein one part is split off in the first backward splitter 23 and fed to the superposing unit 7. The first part of the second light signal LS2 passes through the first backward splitter 23 and the delay line 8 in a direction opposite to the first part of the light signal LS1, wherein one part is split off in the second backward splitter 24 and is fed to the superposing unit 7 (via the actuating unit 6).

The delay line 8 in particular is formed by an optical fiber whose ends are each coupled with a waveguide which in turn is connected to one of the backward couplers 23, 24. The backward couplers 23, 24 are each formed for example by a circulator. With such a circulator, for example, an at least approximately loss-free separation of the counter-propagating signals is possible.

Figure 2:
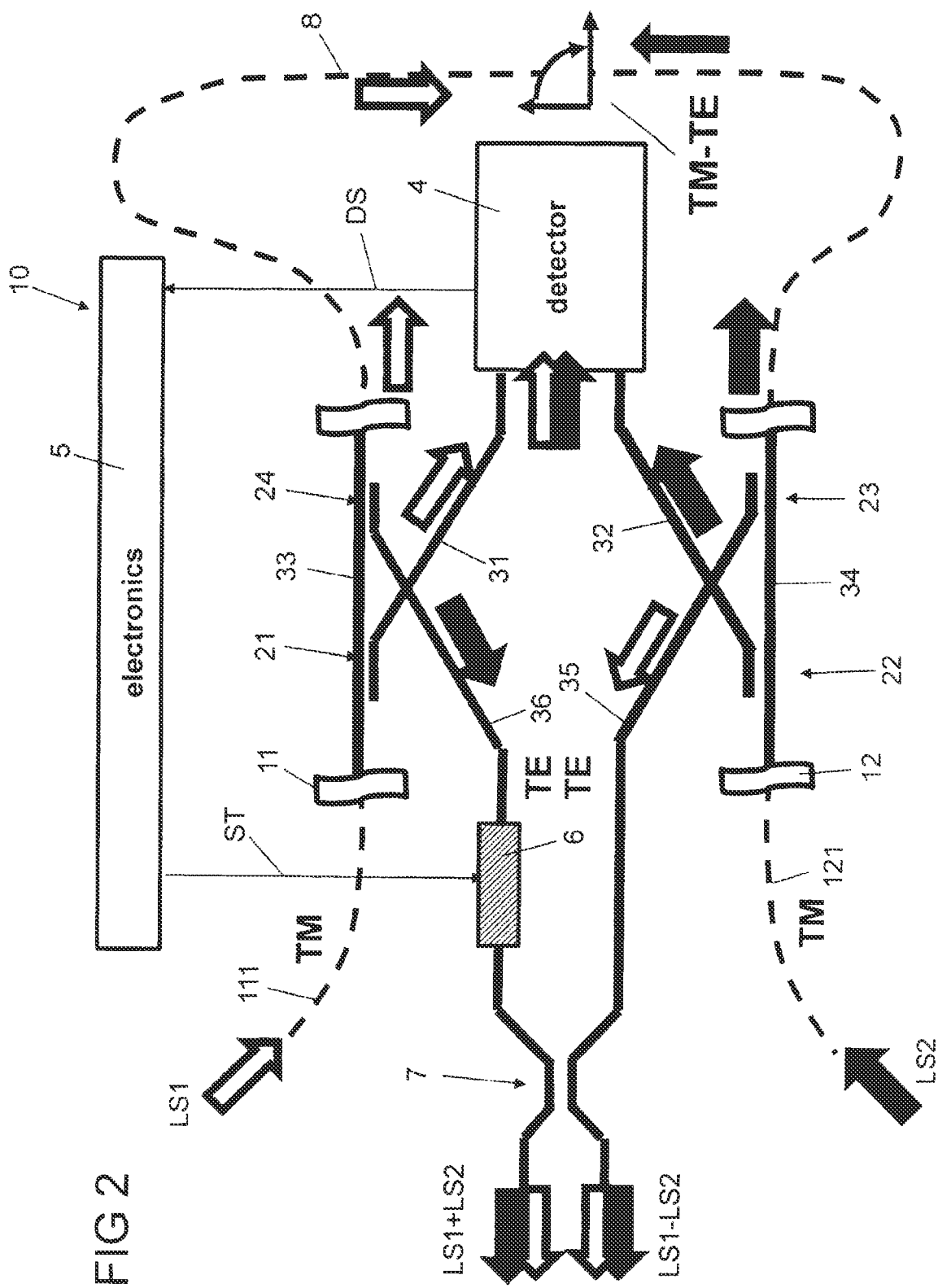
FIG. 2 shows a development of the optical assembly of FIG. 1.

It is also conceivable that the backward couplers 23, 24 are implemented by a polarization splitter; in particular in the case that the polarization of the light signals is known or regulated before arrival in the optical assembly 10 (for example a TM polarization as indicated in FIG. 2) or a polarization diversity scheme exists, in which polarizations are processed separately and individually. When using polarization splitters, it is in particular possible that the polarization of the light signals is rotated by 90° while passing through the section between the backward couplers 23, 24, i.e. in particular while passing through the delay line 8, as this is indicated in FIG. 2. For example, the delay line 8 is configured correspondingly; for example by using a correspondingly rotated optical fiber or an optical fiber at least correspondingly rotating the polarization; e.g. a "PM" optical fiber, which is arranged at the second outputs of the first and the second beam splitter/waveguide with an orthogonal alignment of the optical axes.

In the respective backward splitter 23, 24 disposed behind the delay line 8 as seen in the running direction of the first parts of the light signals LS1, LS2 further splitting of the light signals is effected, wherein one part of the light signals each is guided to inputs of the superposing unit 7 via waveguides 35, 36. The actuating unit 6 already mentioned above is disposed between the backward splitter 24 and the superposing unit 7, wherein it is conceivable that an actuating unit also is disposed in the path between the backward splitter 23 and the superposing unit 7, which likewise is actuated by the electronic signal processing unit 5. The waveguides 31, 36 or 32, 35 cross each other, which can minimize potentially involved optical losses for example of a planar waveguide platform explained below.

In the superposing unit 7 the interference of the light signals LS1, LS2 (i.e. of the parts of the light signals LS1, LS2 arriving there) is effected, wherein the superposing unit 7 for example has two outputs from each of which an output signal exits; for example a sum signal (indicated in FIG. 1 by "LS1+LS2") or a difference signal (indicated in FIG. 1 by "LS1−LS2").

Figure 3:
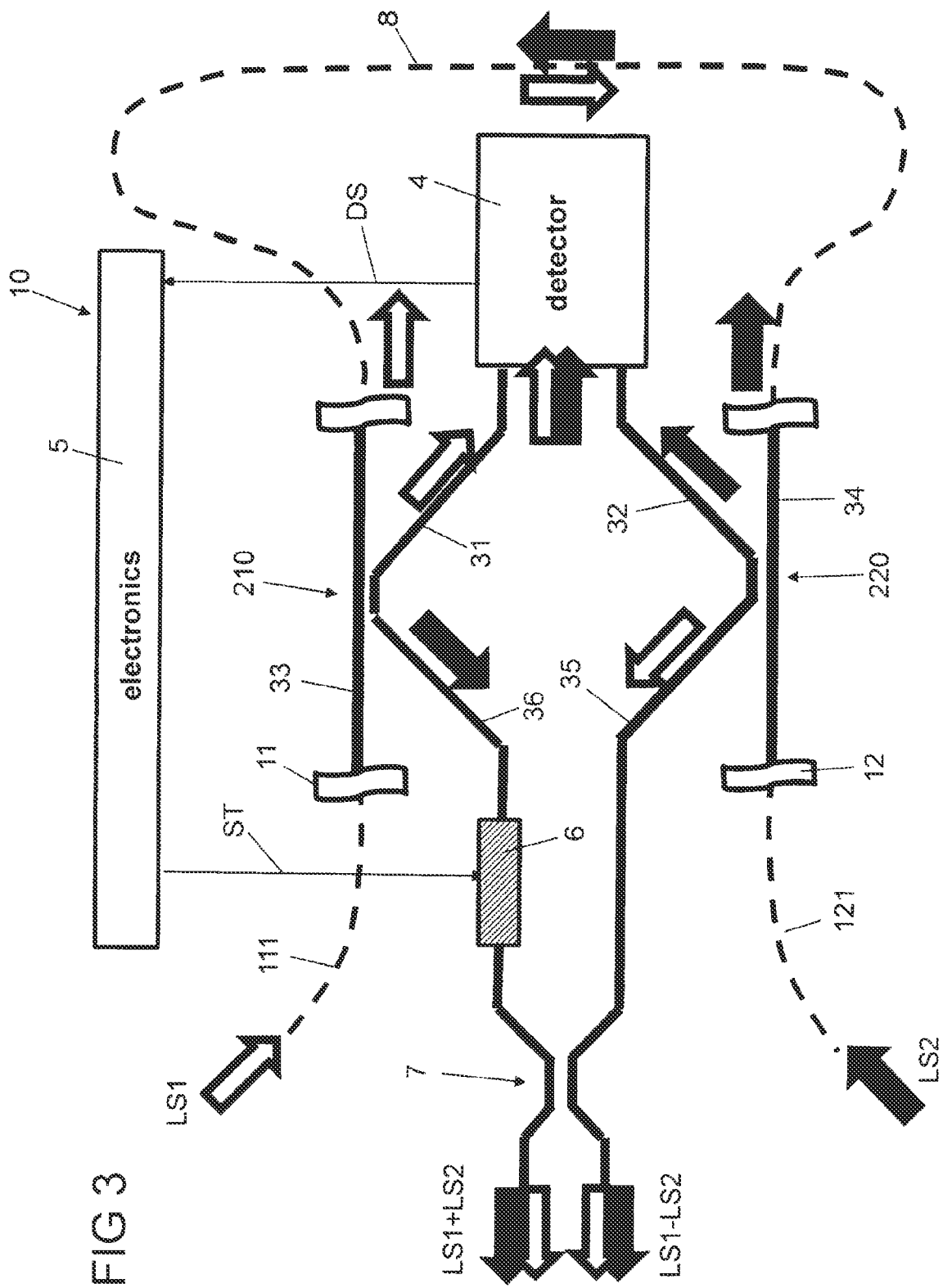
FIG. 3 shows another development of the optical assembly of FIG. 1.

FIG. 3 shows a modification of FIGS. 1 and 2, according to which the forward and backward splitters 21, 24 and 22, 23 located in the same path each are formed by an individual, common component. For example, there is each used one coupler 210, 220 (for example each in the form of a 3 dB coupler, wherein the first coupler 210 forms both the forward splitter 21 and the backward splitter 24, and correspondingly the second coupler 220 forms the forward splitter 22 and the backward splitter 23 of FIGS. 1 and 2. The couplers 210, 220 can each be configured as an integrated chip. It is conceivable that isolators are used in order to suppress the input of light into the input optical fibers 111, 121.

Figure 4:
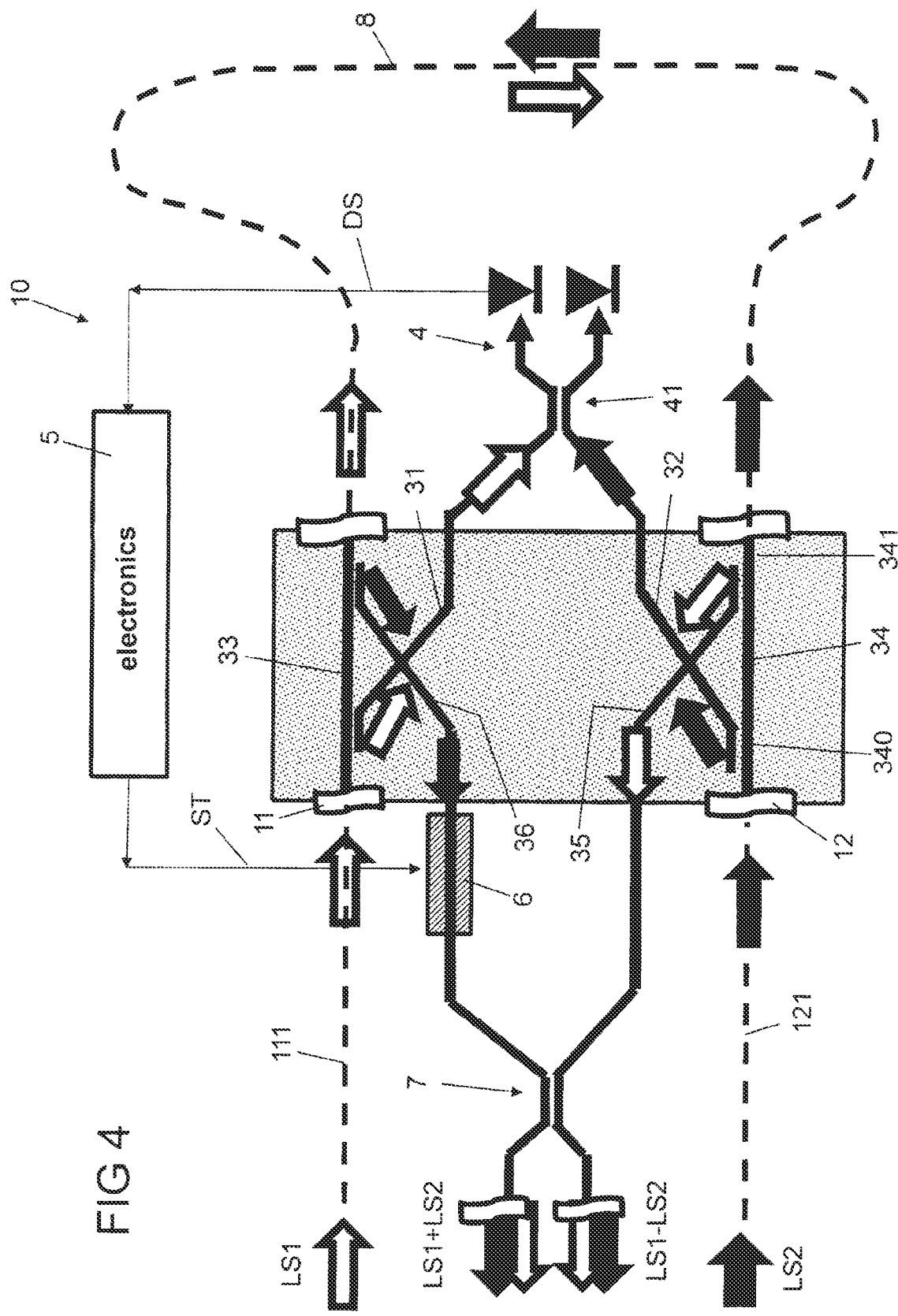
FIG. 4 schematically shows an optical assembly according to a second exemplary embodiment.

The waveguides in a central area 101 of the optical circuit 10, i.e. in particular the waveguides 31-36, for example are fastened on a rather stable carrier in as vibration-resistant manner as possible, for example glued or cast. In addition, these waveguides can also be shielded against thermal influences, for example likewise by means of a corresponding casting compound. It is possible, for example, that the central area 101 of the optical circuit 10, which comprises the waveguides 31-36 as well as the forward and backward splitters 21-24 or other passive components, are implemented on a monolithic or hybrid integrated passive waveguide platform 100 (for example on the basis of nitrides, polymers, glass and/or silicon). In particular, the components of the central area 101 are arranged on a common carrier of the waveguide platform 100, as this is shown in FIG. 4. The waveguides 31-36 are each guided up to the end faces of the waveguide platform 100. Correspondingly, the input optical fibers 111, 121 can be coupled into front ends 330, 340 of the waveguides 33, 34 so that the ends 330, 340 form the inputs of the optical circuit 10. Rear ends 331, 341 of the waveguides 33, 34 are each coupled to an end of an optical fiber forming the delay line 8.

The components of the detector 4, the actuating unit 6 and the superposing unit 7 in particular are not also disposed on the carrier of the waveguide platform 100, but on separate carriers, wherein they however are optically coupled with the waveguide platform 100, i.e. with the corresponding waveguides of the waveguide platform 100, in particular with the waveguides 31, 32, 35 and 36.

Figure 5:
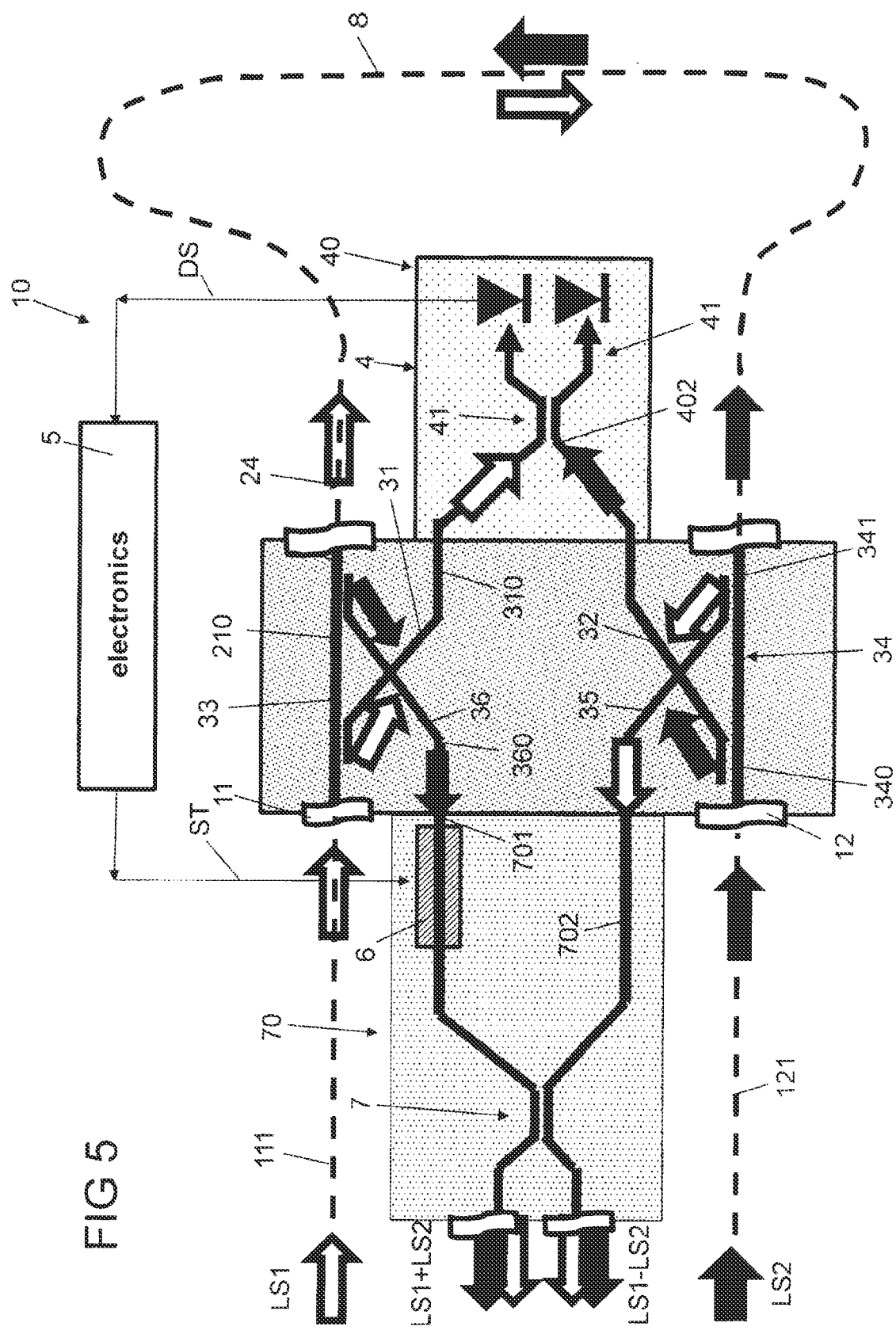
FIG. 5 schematically shows an optical assembly according to a third exemplary embodiment.

It is conceivable, for example, that the detector 4 is configured in the form of an optoelectronic chip 40 that is connected to the waveguide platform 100 (FIG. 5). The chip 40 in particular includes input waveguides 401, 402 that are coupled with ends 310, 320 of the waveguides 31, 32 of the waveguide platform 100; in particular due to the fact that the chip 40 is arranged on a facet of the waveguide platform 100, in particular of the waveguide ends 310, 320.

Moreover, components (in particular all components) of the actuating unit 6 (for example a phase and/or amplitude modulator, an IQ modulator and/or a polarization rotator) and of the superposing unit 7 can be arranged on a common carrier. For example, the actuating unit 6 and the superposing unit 7 are formed by a common optoelectronic chip 70. The chip 70 is arranged on a facet of the waveguide platform 100 opposite the detector 4, wherein input waveguides 701, 702 of the chip 70 are connected to ends 360, 350 of the waveguides 36, 35.

Figure 6:
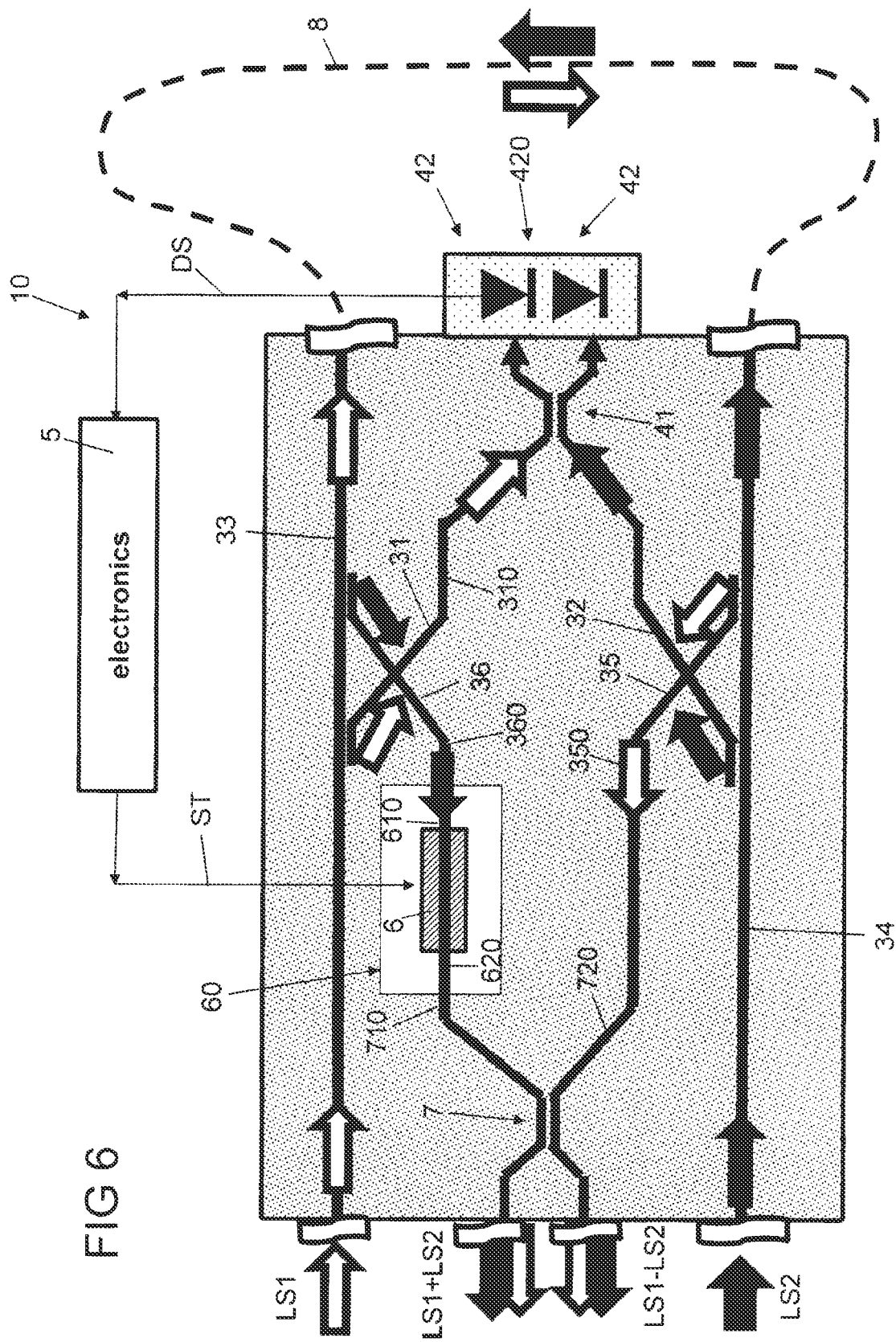
FIG. 6 schematically shows an optical assembly according to a fourth exemplary embodiment.

It is also possible, however, that the superposing unit 7 likewise forms part of the waveguide platform 100 and, correspondingly, the components of the superposing unit 7 are also arranged on the carrier of the waveguide platform 100. At the same time, some components of the detector 4, in particular passive components such as an interferometer 41, can likewise form part of the waveguide platform 100 and correspondingly be disposed on the carrier of the waveguide platform 100, as this is shown in FIG. 6. However, active components of the detector 4, in particular active optoelectronic receivers 42, can be coupled to a facet and/or surface of the waveguide platform 100 as a separate chip 420.

It is also possible that the actuating unit at least partly does not form part of the waveguide platform 100. For example, at least some components of the actuating unit 6 are coupled to the waveguide platform 100 as a separate chip 60. The chip 60 in particular is arranged on a facet or on a surface of the waveguide platform 100, wherein waveguides 610, 620 (input and output waveguides) of the chip 60 are connected to waveguides 36 and 710, respectively, of the waveguide platform 100.

A possible application of the optical assembly according to the solution (e.g. according to one of the exemplary embodiments shown in FIGS. 1 to 6) consists in the wavelength-selective manipulation of light signals. For example, the first light signal LS1 in the manner of a mode comb comprises a plurality of equidistant wavelengths $\lambda_n$, as this is shown in the upper drawing of FIG. 7. The wavelengths of the light signals can also be provided with a modulation in amplitude and/or phase, e.g. correspondingly high-rate communication signals in the Gb/s range.

The second light signal LS2 can be an output signal of a local oscillator and correspondingly have a predeterminable wavelength $\lambda_i$ (middle drawing of FIG. 7). After adaptation at least of the phase at least of the first light signal LS1 by means of the detector 4, the electronic signal processing unit 5 and the actuating unit 6, the light signals LS1, LS2 are subsequently superposed in the superposing unit 7 (lower drawing of FIG. 7). For example, the relative phase between the light signals LS1, LS2 is set such that a destructive interference of the signals LS1, LS2 and hence a selective deletion of the wavelength $\lambda_i$ is effected in the mode comb.

The invention claimed is:

1. An optical assembly for optical signal processing, comprising:
    a first input for coupling in a first light signal;
    a second input for coupling in a second light signal;
    a first beam splitter for splitting the first light signal into a first part and a second part;
    a second beam splitter for splitting the second light signal into a first part and a second part;
    a superposing unit for superposing the first part of the first light signal with the first part of the second light signal;
    a detector for detecting the second part of the first light signal and the second part of the second light signal, wherein the detector is configured to generate at least one electrical signal dependent on the detected second part of the first and second light signals;
    an electronic signal processing unit that is configured to generate at least one control signal in dependence on the signal generated by the detector;
    at least one actuating unit to which the control signal generated by the electronic signal processing unit can be fed and which is configured to change the phase, the amplitude and/or the polarization of the first part of the first light signal and/or the second part of the second light signal in dependence on the control signal, before the first parts of the first and second light signals are superposed in the superposing unit;
    a delay line for generating a delay of a running time of the first part of the first light signal and of the first part of the second light signal up to the superposing unit, and wherein the delay line is configured and arranged such that the first part of the first light signal and the first part of the second light signal pass through the delay line in opposite directions.

2. The optical assembly according to claim 1, wherein the delay line is formed by at least one optical waveguide.

3. The optical assembly according to claim 2, wherein the optical waveguide is an optical fiber.

4. The optical assembly according to claim 1, wherein the delay line is configured such that the first part of the first and/or the second light signal reaches the optical actuating unit at least substantially at the same time as the control signal.

5. The optical assembly according to claim 1, further comprising a third beam splitter by means of which a part of the first part of the first light signal can be split off after passing through the delay line and can be fed to the superposing unit and/or a fourth beam splitter by means of which a part of the first part of the second light signal can be split off after passing through the delay line and can be fed to the superposing unit.

6. The optical assembly according to claim 5, wherein the first and the fourth beam splitter together are formed by a first coupler and/or the second and the third beam splitter together are formed by a second coupler.

7. The optical assembly according to claim 5, wherein the third beam splitter is formed by a circulator and/or the fourth beam splitter is formed by a circulator.

8. The optical assembly according to claim 5, wherein the third beam splitter is formed by a polarization splitter and/or the fourth beam splitter is formed by a polarization splitter.

9. The optical assembly according to claim 5, wherein the first and the second beam splitter are arranged on a common carrier, and wherein the first beam splitter is connected to the fourth beam splitter via a first connection waveguide, and the second beam splitter is connected to the fourth beam splitter via a second connection waveguide, wherein in the first, second, third and fourth beam splitters as well as the first and the second connection waveguide are fixed on a common carrier.

10. The optical assembly according to claim 1, wherein the first and the second beam splitter are arranged on a common carrier.

11. The optical assembly according to claim 10, wherein the detector is formed by an integrated optoelectronic chip which is connected to the carrier such that a first output waveguide arranged on the carrier is coupled with a first input waveguide of the optoelectronic chip and a second output waveguide arranged on the carrier is coupled with a second input waveguide of the optoelectronic chip.

12. The optical assembly according to claim 10, wherein the detector includes at least one passive component and at least one active detection unit, wherein the passive component is arranged on the carrier and the active detection unit is disposed on a substrate different from the carrier.

13. The optical assembly according to claim 10, wherein the superposing unit is arranged on the carrier, wherein the actuating unit is formed by an electro-optically active chip having a substrate different from the carrier, wherein the chip is connected to the carrier such that a waveguide arranged on the carrier is coupled with an input waveguide of the chip and an output waveguide of the chip is coupled with a waveguide arranged on the carrier.

14. A method for optical signal processing by using an optical assembly according to claim 1, comprising:
   coupling a first light signal into a first input of the optical assembly;
   coupling a second light signal into a second input of the optical assembly;
   splitting the first light signal into a first part and a second part;
   splitting the second light signal into a first part and a second part;
   detecting the second part of the first light signal and the second part of the second light signal by means of a detector and generating at least one electrical signal in dependence on the received second parts of the first and second light signals;
   generating at least one control signal in dependence on the signal generated by the detector by means of an electronic signal processing unit;
   generating a delay of a running time of the first part of the first light signal and of the first part of the second light signal up to the superposing unit of the optical assembly,
   changing the phase, the amplitude and/or the polarization of the first part of the first light signal and/or the first part of the second light signal in dependence on the control signal; and
   superposing the first part of the first light signal with the first part of the second light signal after changing the phase, the amplitude and/or the polarization of the first part of the first light signal and/or the first part of the second light signal,
   wherein the delay of the running time is generated by the first part of the first light signal and the first part of the second light signal passing through a delay line in opposite directions.

15. The method according to claim 14, wherein the first light signal has a spectrum which includes a plurality of wavelengths spaced apart from each other, and wherein the spectrum of the second light signal substantially comprises an individual wavelength that corresponds to one of the wavelengths of the first light signal.

* * * * *